United States Patent
Locke et al.

(10) Patent No.: US 6,550,182 B2
(45) Date of Patent: Apr. 22, 2003

(54) IMPLANTABLE AERATING ROOT PRUNER

(76) Inventors: Randal D. A. Locke, P.O. Box 1325, Redway, CA (US) 95560; Daniel Paul Dunbar, P.O. Box 1691, Redway, CA (US) 95560; Teresa Marie Locke, P.O. Box 1325, Redway, CA (US) 95560

( * ) Notice: Subject to any disclaimer, the term of this patent is extended or adjusted under 35 U.S.C. 154(b) by 0 days.

(21) Appl. No.: 09/824,987

(22) Filed: Apr. 2, 2001

(65) Prior Publication Data

US 2002/0174598 A1 Nov. 28, 2002

(51) Int. Cl.[7] ............................................. A01G 29/00
(52) U.S. Cl. .............................................. 47/48.5
(58) Field of Search .................. 47/1.5, 48.5; 43/121, 43/131

(56) References Cited

U.S. PATENT DOCUMENTS

| | | | | |
|---|---|---|---|---|
| 588,278 A | * | 8/1897 | Kling | 47/48.5 |
| 1,394,041 A | * | 10/1921 | Robbins | 47/48.5 |
| 2,791,347 A | * | 5/1957 | Boehm | 47/48.5 |
| 3,962,822 A | | 6/1976 | Walters | |
| 4,175,356 A | | 11/1979 | Allen | |
| 4,361,983 A | * | 12/1982 | Wilson | 47/48.5 |
| 4,442,628 A | | 4/1984 | Whitcomb | |
| 4,497,132 A | | 2/1985 | Whitcomb | |
| 4,510,712 A | | 4/1985 | Whitcomb | |
| 4,574,522 A | | 3/1986 | Reiger | |
| 4,682,550 A | | 7/1987 | Joy | |
| 4,716,680 A | | 1/1988 | Whitcomb | |
| 4,753,037 A | | 6/1988 | Whitcomb | |
| 5,222,326 A | | 6/1993 | Higgins | |
| 5,237,714 A | * | 8/1993 | Warner | 43/131 |
| 5,241,784 A | | 9/1993 | Henry | |
| 5,301,465 A | | 4/1994 | Caferro | |
| 5,557,886 A | | 9/1996 | Whitcomb | |
| 5,692,338 A | | 12/1997 | Rose | |
| 5,761,846 A | * | 6/1998 | Marz | 47/48.5 |
| 5,761,848 A | | 6/1998 | Manlove | |
| 5,901,496 A | * | 5/1999 | Woodruff | 43/124 |
| 5,975,797 A | * | 11/1999 | Thomas et al. | 405/36 |
| 6,016,625 A | * | 1/2000 | Bishoff et al. | 43/107 |

FOREIGN PATENT DOCUMENTS

JP    409172934 A  *  7/1997  ............. A01M/1/00

* cited by examiner

Primary Examiner—Peter M. Poon
Assistant Examiner—Son T. Nguyen

(57) ABSTRACT

Disclosed is an implantable aerating root pruner (IARP) formed from a pair of thin walled substantially identical rigid sheet members which are dismountably fitted together to form a stake-like conduit each of which sheet members has a plurality of apertures therein which creates a grate-like structure with a high ratio of total open area to total surface area, one end of each of which is tapered to form, when the sheet members are fitted together to form the IARP, an edge or point which facilitates insertion of the IARP into planting medium and the end portion of the other end of each thereof lacks the apertures and is adapted to project above the surface of the planting medium. The sheet members can be flat separate elements which form a box-like conduit or semi-cylindrical and joined together by hinges and which form a cylindrical conduit.

16 Claims, 8 Drawing Sheets

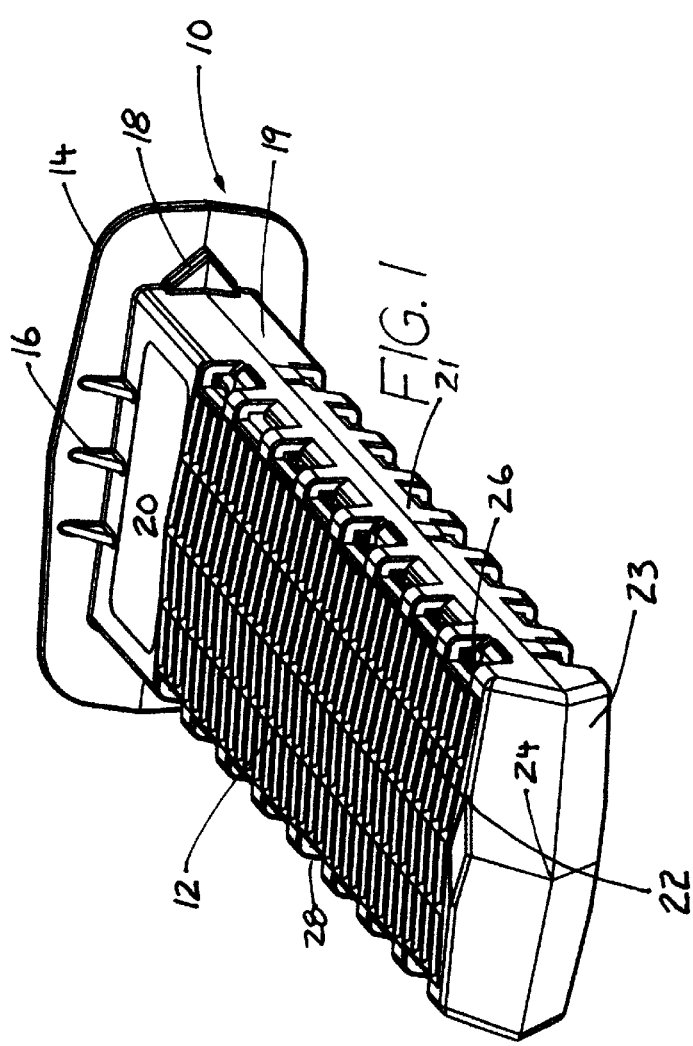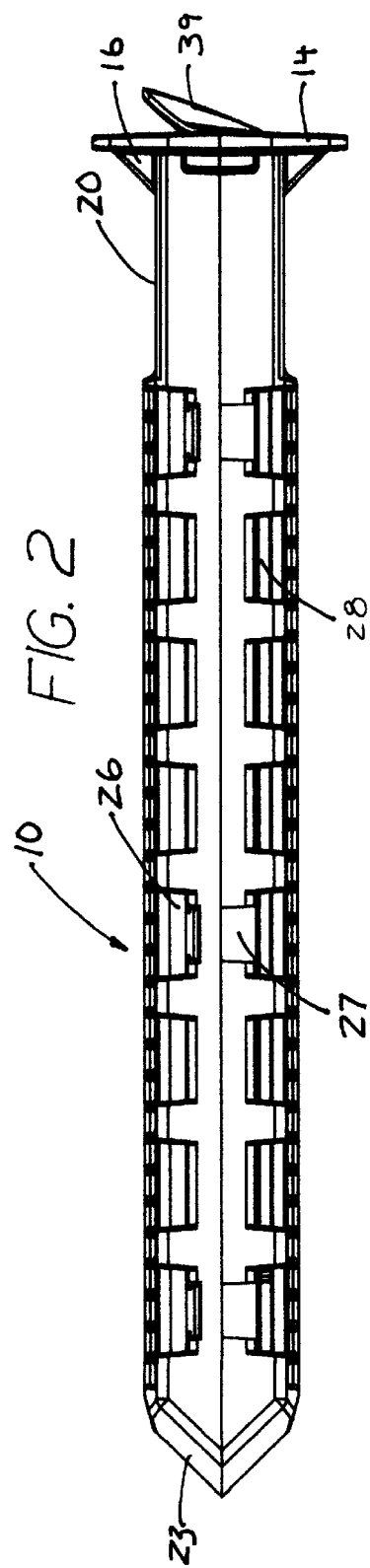

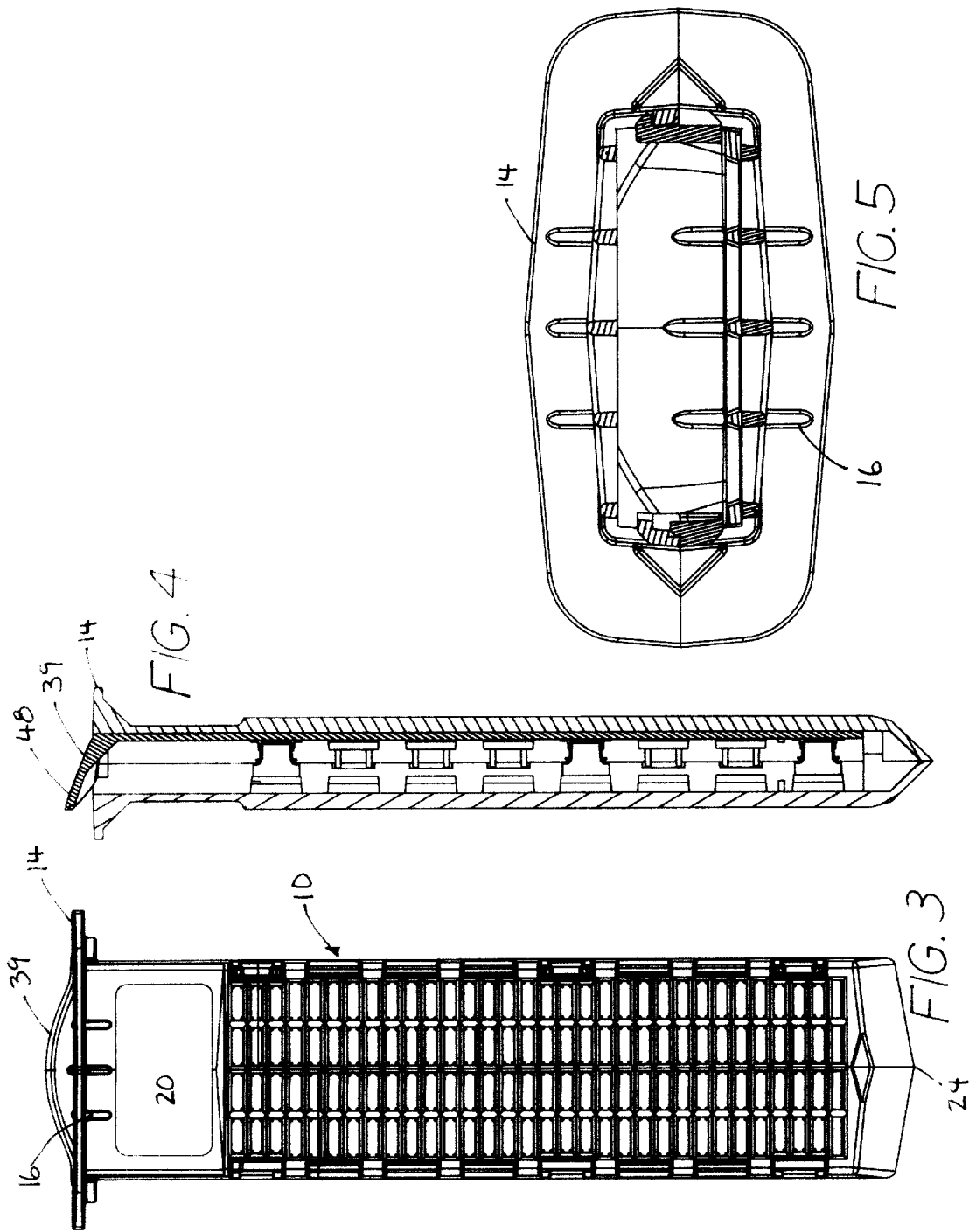

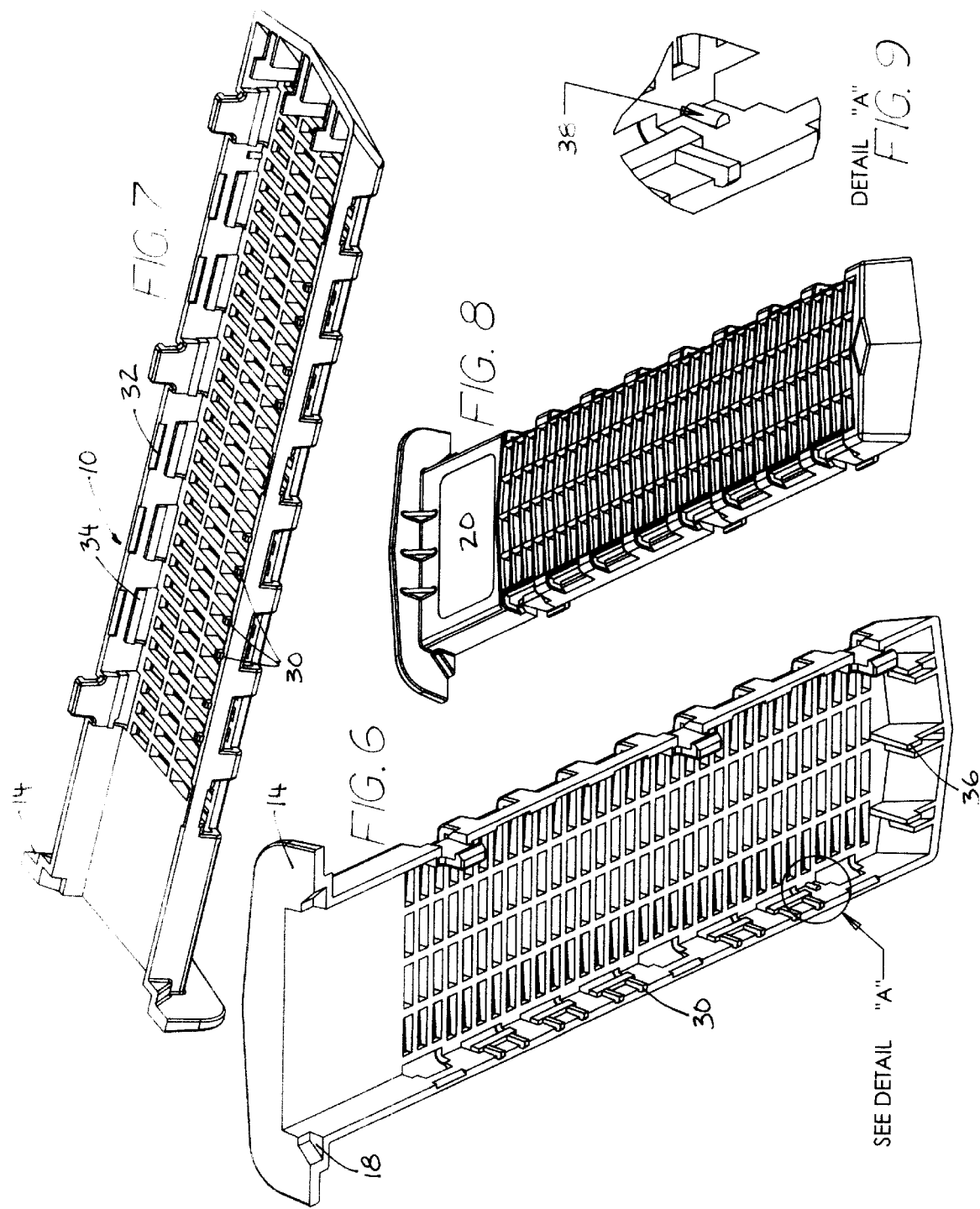

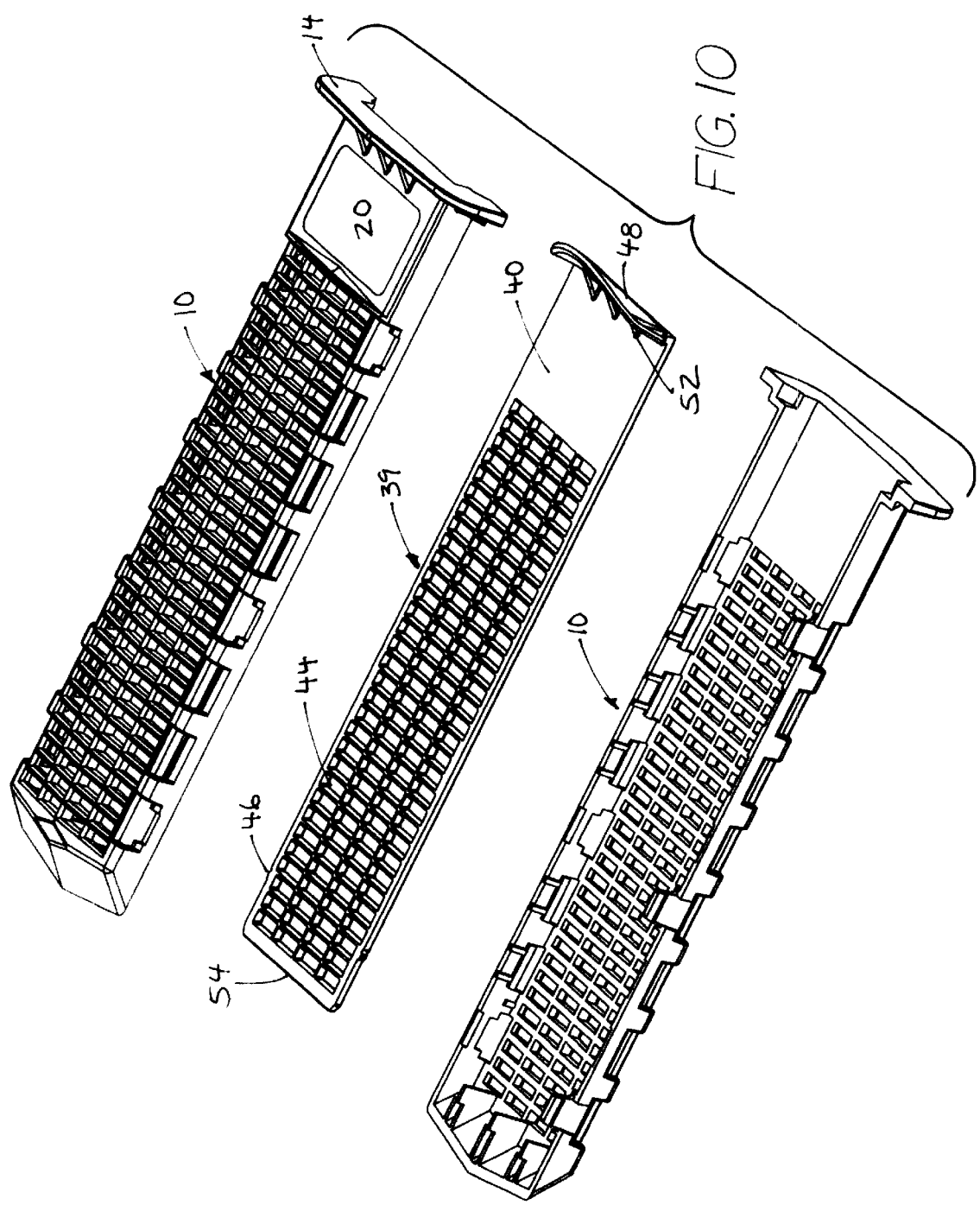

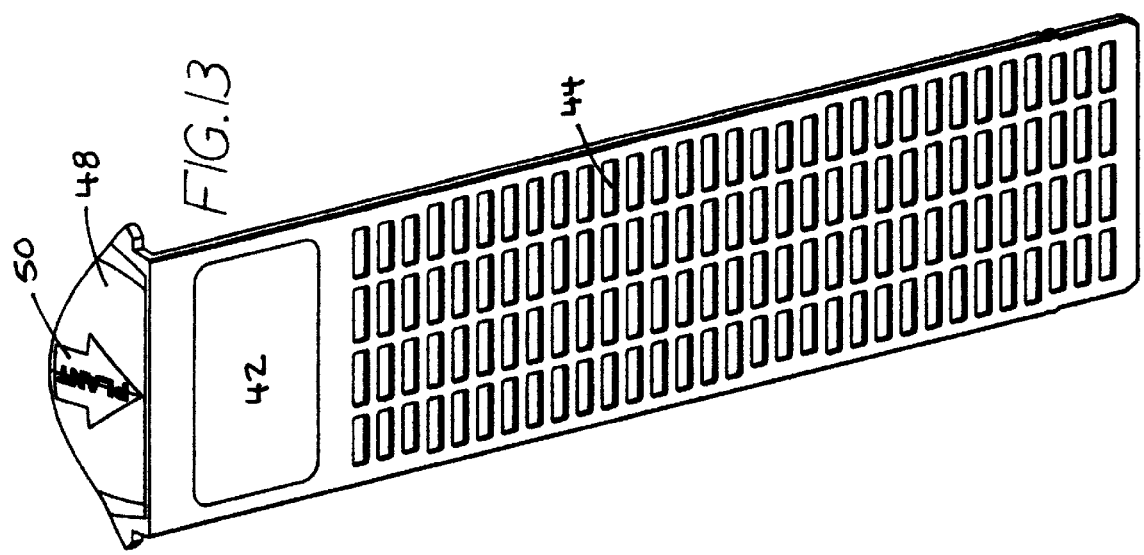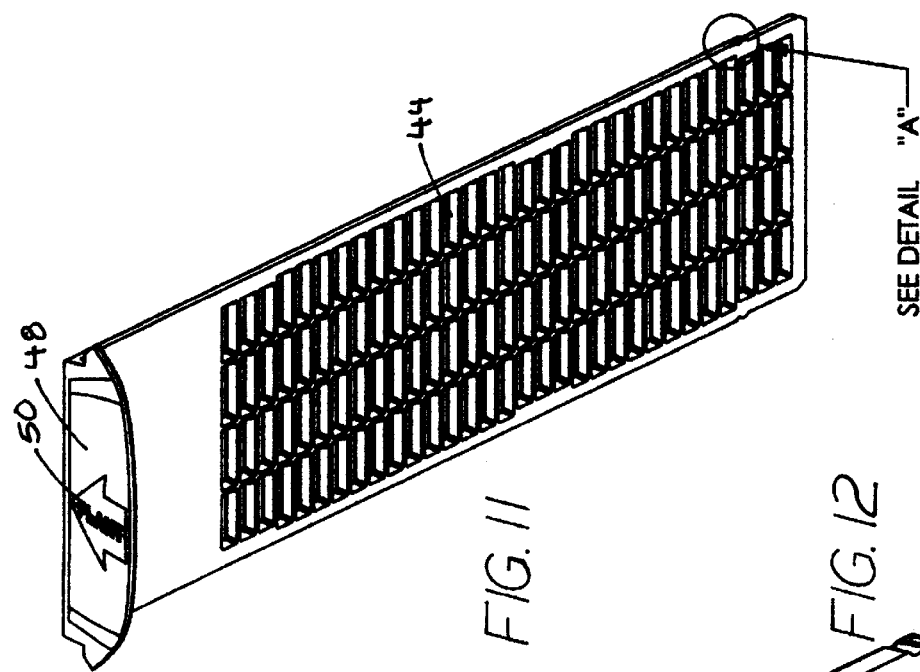

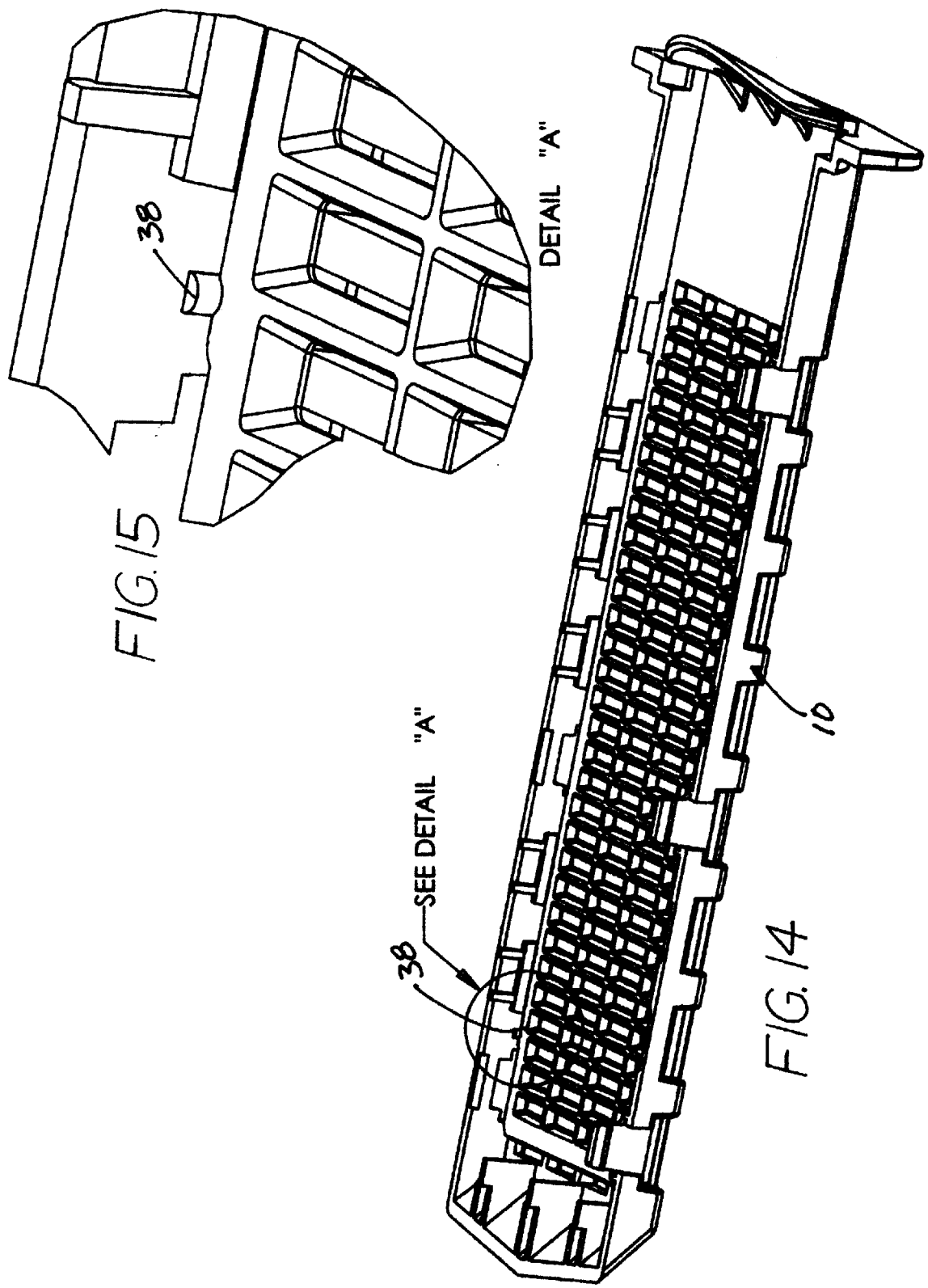

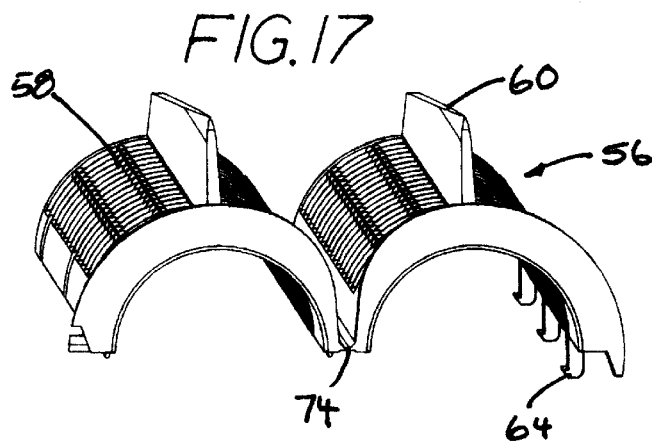
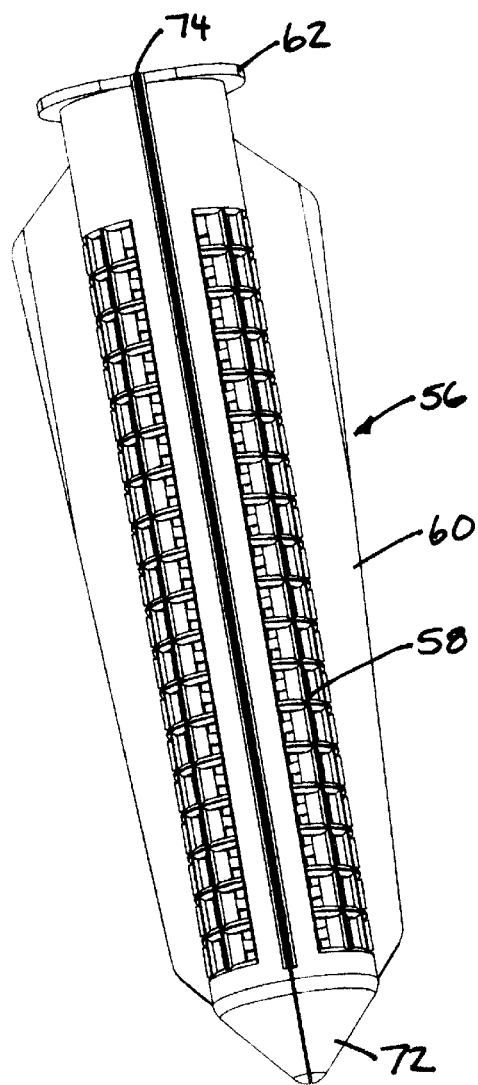
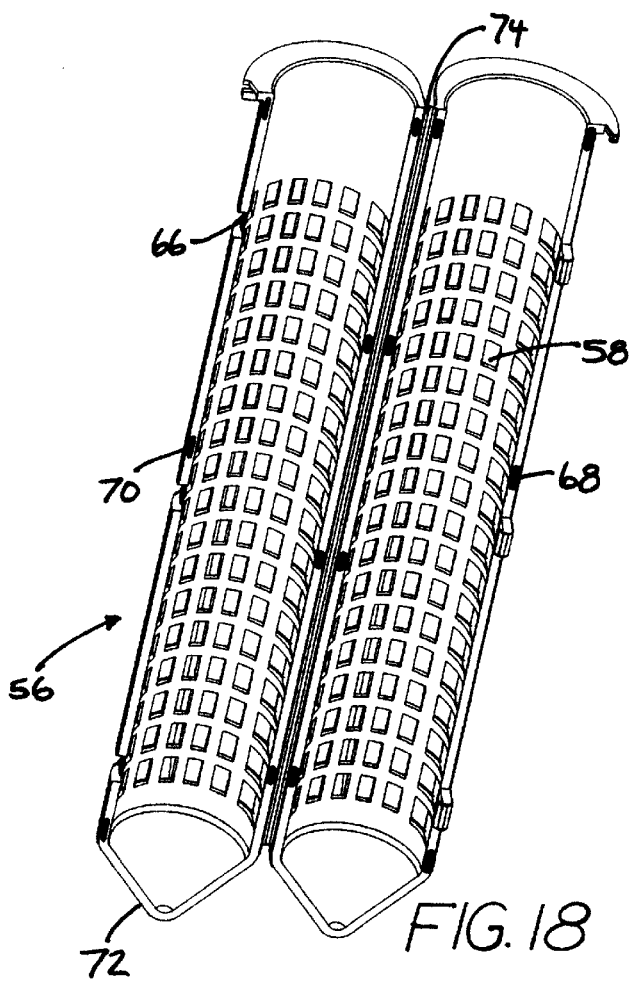

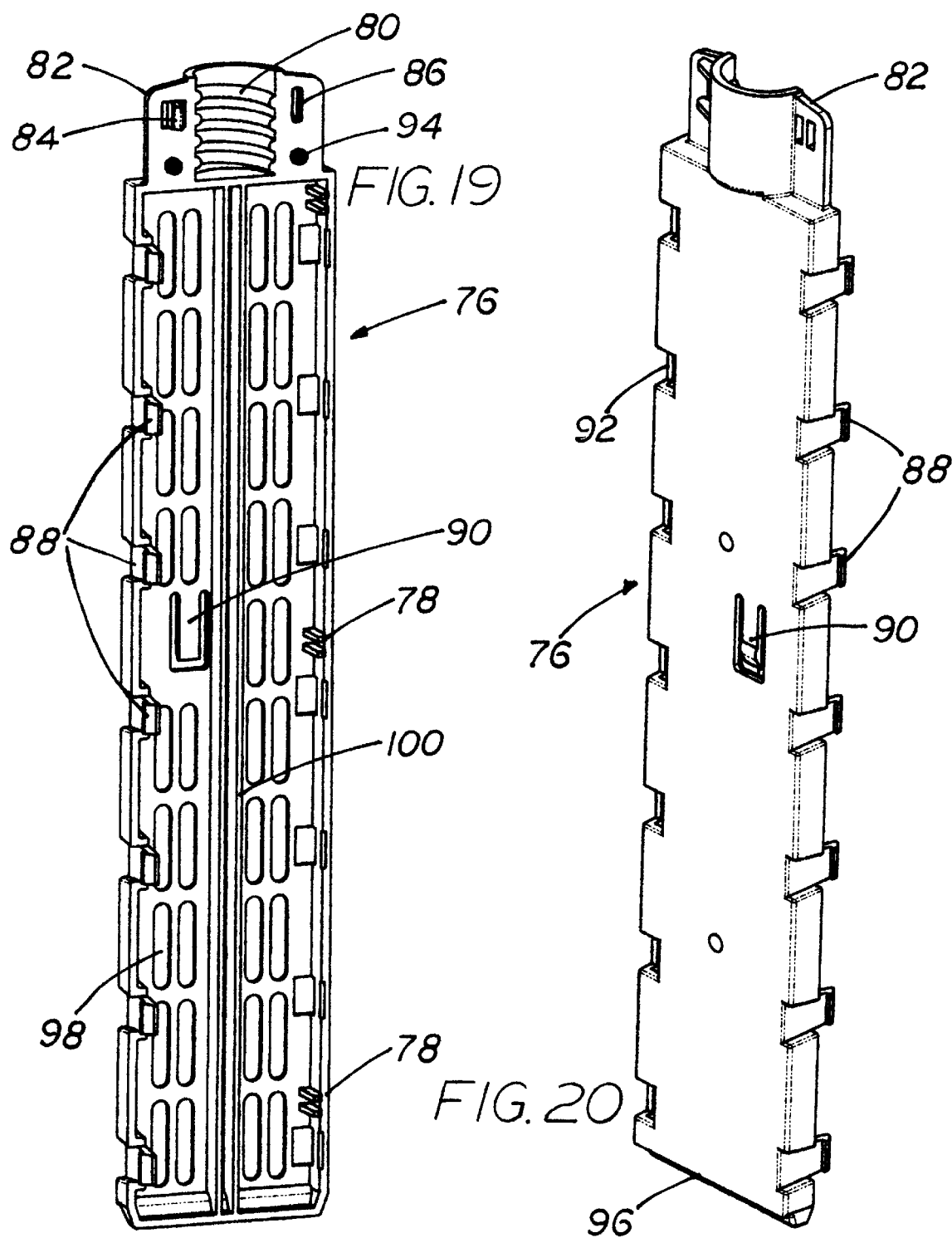

IMPLANTABLE AERATING ROOT PRUNER

This invention relates to plant growth accelerating and plant root aeration devices, more particularly to mechanical and air root pruners which are adapted to be implanted within plant medium to accelerate and enhance the development and growth rates of root balls and subsequent vegetative growth of plants grown therein, to combinations of an implantable aerating root pruner (hereinafter called "IARP") and a root cutting implement (hereinafter called "CUTTER") for cutting roots growing into the IARP, and to an IARP insertion/cutting implement (hereinafter called "INSERTER") that can both cut roots growing into the IARP as well as facilitating the penetration and placement of the IARP into soil or plant media while minimizing the work required to do so.

BACKGROUND OF THE INVENTION

Air root pruning devices and methods are well known in the prior art. See, e.g., U.S. Pat. Nos. 4,442,628; 4,497,132; 4,510,712; 4,574,522; 4,716,680; 4,753,037; 5,222,326; 5,301,465; 5,557,886 and 5,761,848. In each of these devices the air root pruning structure and function is an integral element of the container in which the plant is to be grown, thereby contributing significantly to the cost of its production. U.S. Pat. No. 5,241,784 discloses a slotted air root pruning plant root container that is inserted into a plant pot. None of these prior art air root pruning devices has achieved continuing commercial success, for a variety of reasons which include the need for the use of customized pots and one or more of difficulty in removing the mature plant from the plant pot; higher production cost of such customized plant pots; loss of planting medium from the plant pots; increased shipping costs because of their lack of stackability; and incompatibility with automatic equipment used by commercial growers for filling plant pots with planting medium.

U.S. Pat. No. 4,175,356 discloses a plant aerator tube with radial perforations in it whose purpose is to reduce the undesirable effects upon the health of the plant of top watering and over watering. Structurally, the aerating tube of the '356 patent lacks a significant air root pruning effect because only a very limited number of roots of a plant growing in a pot in which it is inserted would be affected in an air root pruning way by its presence in the pot.

U.S. Pat. No. 4,682,550 discloses an apparatus for loosening, aerating and fertilizing soil plant roots intended for temporary insertion into a predrilled hole in soil for injecting fertilizer, high pressure air and water into the soil. U.S. Pat. No. 3,962,822 discloses a slotted physically or biologically degradable plant container adapted to block growth of roots through the slots thereof when a plurality thereof are positioned side-by-side and to permit growth there through when the containers are separately imbedded in the ground.

In our prior issued U.S. Pat. Nos. 5,782,035 and 5,918,415 we disclose an air root pruner adapted to be fitted in an automatic watering garden container. The IARP device of this invention differs inter alia from the air root pruners of the prior art by being useable in any planting medium regardless of its location be it ground soil or planting medium contained within a plant pot or other container. They are easily inserted by hand into loosely packed soil, such as common potting soil, and can also be implanted into more densely packed soils using the combination of the IARP and its companion inserter/root cutter device of this invention. The IARP can be inserted into planting medium in a plant pot, either before or after the pot contains a growing plant, or into soil proximate a plant growing in the ground. The IARP has a dramatic effect upon the rate of root ball and vegetative growth of a plant growing proximate thereto. It differs structurally from the perforated stakes of U.S. Pat. No. 3,962,822, inter alia, by providing a much larger number of perforations in the portion of the wall thereof which faces the plant, thereby achieving an enhanced aeration of the root ball and additionally providing a passive air root pruning effect as well as enabling mechanical pruning of roots with the IARP cutter or the cutter implements.

The method of this invention provides an economical way of increasing the rate of fine hair and lateral root development and thus the vegetative growth rate of a plant using inexpensive and reusable devices.

OBJECTS OF THE INVENTION

It is an object of this invention to provide an aerating root pruner which lacks most or all of the deficiencies of the above-described prior art aerating and air root pruning devices. It is another object to provide an aerating root pruner in the form of a perforated conduit whose perforations provide the conduit with a high ratio of total open area to total surface area. It is yet another object to provide an aerating root pruner whose geometry and strength facilitates its insertion into hard packed planting medium. It is a further object to provide an aerating root pruner, which provides a high level of ambient air access to the planting medium along the length of the conduit when inserted therein. A further object is to provide a device which promotes uniform distribution of water in the planting medium from its surface to the bottom of the pruning stake and which has an air root pruning effect on the roots of a plant growing proximate thereto in the planting medium.. A still further object is to provide a method of accelerating the rate of growth of a plant by growing the plant, either in a plant pot containing one or more of the IARP's of this invention in the planting medium on in ground containing one or more of them proximate to the growing plant. Other objects will be apparent to those skilled in the art to which this invention pertains.

SUMMARY OF THE INVENTION

In a first article of manufacture aspect, this invention relates to an implantable aerating root pruner (IARP) comprising a pair of thin walled substantially rigid sheet members dismountably fitted together in a spaced apart configuration which forms a stake-like conduit, at least one of which sheet members have a plurality of apertures therein which form a grate-like structure which provides the conduit with a high ratio of total open area to total surface area, a first end of each of which sheet members is tapered to form, when the sheet members are fitted together to form the first article, an edge or point to facilitate insertion of the first article into planting medium and the end portion of the other end of each sheet members lacks the apertures and is adapted to project above the surface of the planting medium, which conduit provides ambient air access to the planting medium along the length of the conduit when the first article is inserted in the planting medium and thereby promotes enhanced aeration of and uniform distribution of water in the planting medium from the surface of the planting medium to the bottom of the pruning stake and which has air root pruning effect on the roots of a plant growing proximate thereof in the planting medium.

In a preferred aspect of the first article of manufacture aspect, both sheet members are separate, apertured, flat walled and fit together to form a thin elongate rectangular box-like structure whose front and back faces are formed by the sheet members and comprise joining means which render the sheet members readily joinable together and separable from each other. In a more preferred aspect, the sheet members are identical. In other preferred aspects, the first article of manufacture is one or more of formed of injection-molded polypropylene; and the ratio of the total apertured area to total solid area is at least 2:1.

In an alternative aspect of the first article of manufacture aspect, the sheet members are semi-cylindrical and permanently joined together along one side edge thereof in a side-by-side position by flexible hinge-like connecting means which permits the sheet members to be folder together to form a cylindrical conduit and the sheet members are held in their conduit configuration along the respective other side edge of each thereof by disengageable latch means which permits the sheet members to be reopened to their side-by-side position.

In a second article of manufacture aspect, this invention relates to a combination of the first article of manufacture as defined hereinabove or any of its preferred aspects thereof and an elongate rectangular thin-walled grate-like apertured substantially rigid root cutter plate adapted to be slideably and removably inserted into the first article, in sliding contact with the inner face of one of the apertured sheet members of thereof, to a first position in which its leading end is proximate the bottom of the first article, its other end thereof projects outside the first article and its apertures are out of registry with the apertures of the sheet member with which the cutter plate is sliding contact when the cutter and adapted to be further inserted to a second position in the first article in which its leading end is in contact with the inner leading edge of end portion of the sheet member and its apertures are in registry with the those in the sheet member, and thereby mechanically sever any roots which have invaded the space between the cutter plate and the inner wall of the other sheet member.

In a preferred aspect of the first combination aspect of this invention, the cutter plate has a canopy on its second end which covers the air space between the upper ends of the two sheet members which form the first article of manufacture, thereby preventing planting medium or debris or trash from entering that space while a plant is growing in the plant pot without blocking movement of ambient air within the first article. In other preferred aspects, the first article of manufacture has one or more of the other preferred aspects thereof described hereinabove.

In a first method of use aspect, this invention relates to a method of using the first article of manufacture aspect of this invention to promote the growth rate of a plant by air root pruning the roots thereof, which comprises the step of inserting the first article of manufacture, as defined broadly hereinabove or a preferred embodiment thereof, in the plant medium either before the plant is planted therein or thereafter before the root ball of the plant has fully formed, close enough to the growing plant to be contacted by the tips of the growing roots of the plant; and maintaining the first article in the planting medium for a period of time until in roots of the growing plant have invaded the interior of the first article.

In a preferred aspect, the first method of use comprising the further steps of (a) inserting the first article of manufacture into the planting medium with a handled insertion tool slideably and removably into the interior of the first article until the leading end is at least substantially completely inserted therein, before the first article of manufacture is positioned in the planting to assist the insertion of the first article therein, and/or thereafter when the roots of the plant have invaded the interior of the first article to mechanically sever the roots which have invaded the interior of the first article; and (b) thereafter withdrawing the insertion tool from the first article.

In a second method of use aspect, this invention relates to the use of the first combination of this invention to promote the growth rate of a plant by air root pruning the roots thereof, which comprises the steps of inserting the first combination of this invention as defined hereinabove in the plant medium either before the plant is planted therein or thereafter before the root ball of the plant has fully formed, close enough to the growing plant to be contacted by the tips of the growing roots of the plant; and maintaining the first article in the planting medium for a period of time until in roots of the growing plant have invaded the interior of the first article.

In a preferred aspect, the second method of use aspect comprises the further steps of (a) slideably and removably inserting an insertion tool into the interior of the first article of manufacture of this invention until the leading end is at least substantially completely inserted therein, before the first article is inserted in the planting medium, to assist the insertion of the first article therein, and/or thereafter when the roots of the plant have invaded the interior of the first article, to mechanically sever the roots which have invaded the interior of the first article; and (b) thereafter withdrawing the insertion tool from the first article.

In a third of method of use aspect, this invention relates to a method of using the first combination of this invention as defined broadly hereinabove or a preferred embodiment thereof promote the growth rate of a plant by both mechanically and air root pruning the roots thereof, which comprises the successive steps of (a) inserting the combination into the planting medium, either before the plant is planted therein or thereafter before the root ball of the plant has fully formed, close enough to the growing plant to be contacted by the tips of the growing roots of the plant; (b) maintaining the first combination in the plant medium, with the cutter plate positioned in the first article of manufacture as defined hereinabove so that their respective apertures are in registry, for a period of time until roots in the growing plant have invaded the interior of the first article; and (c) thereafter moving the cutter plate from the first position in the first article to a second position in which their respective apertures of the sheet members and the cutter plate are out of registry, thereby mechanically severing the roots which have invaded the interior of the first article.

BRIEF DESCRIPTION OF THE DRAWINGS

With reference to the drawings:

FIG. 1 is a perspective view of the assembled IARP;

FIG. 2 is a side view in assembled form of the combination of the assembled IARP shown in FIG. 1 and the root cutting unit (cutter) fully inserted therein;

FIG. 3 is a front view of the combination shown in FIG. 2;

FIG. 4 is a vertical section view taken along the line B—B of FIG. 3 of the combination shown in FIGS. 2 and 3;

FIG. 5 is an enlarged offset horizontal section view taken along the line A—A of FIG. 3 of the IARP shown in FIGS. 2 and 3;

FIG. 6 is a perspective interior view showing the panel catch tab structure of one of the pair of identical apertured sheet members from which the IARP shown in FIG. 1 is formed;

FIG. 7 is a perspective interior view showing the panel catch structure of one of the pair of identical apertured sheet members from which the IARP as shown in FIG. 1 is formed;

FIG. 8 is a perspective exterior view of one of the pair of identical apertured sheet members shown in FIG. 7;

FIG. 9 is an enlarged perspective detail view of circled portion A of FIG. 6 which shows one of the cutter positioning tabs thereof;

FIG. 10 is a perspective view, in disassembled form, of the IARP and cutter combination shown in FIG. 2 in assembled form;

FIG. 11 is a perspective view of the non-cutting face of the IARP cutter of FIG. 10;

FIG. 12 is an enlarged perspective detail view of circled area A portion of FIG. 11 which shows the cutter positioning notch;

FIG. 13 is a perspective view of the cutting face of the cutter device shown in FIG. 10;

FIG. 14 is a perspective interior view of one of the sheet members and the cutter shown FIG. 10 with the latter inserted in its fully inserted position;

FIG. 15 is an enlarged perspective detail view of circled area A portion of FIG. 14 which shows the cutter positioning tab;

FIG. 16 is a perspective end and exterior side wall view of an alternative cylindrical embodiment of the IARP of this invention;

FIG. 17 is a perspective exterior top view of the cylindrical embodiment of the IARP shown in FIG. 16 as molded and before assembly; and FIG. 18 is a perspective interior view of the cylindrical embodiment of the IARP as shown in FIG. 17.

FIG. 19 is a perspective interior view of one of two pieces of the inserter-cutter tool for implanting and root trimming the IARP as shown in FIG. 1.

FIG. 20 is a perspective exterior view of one of two pieces of the inserter-cutter tool for implanting and root trimming the IARP as shown in FIG. 1.

DESCRIPTION OF THE PREFERRED EMBODIMENTS

The term "implantable" as used herein in describing the IARP of this invention means an air root pruner capable of being implanted into plant growing media, including but not limited to ground soil, planting soil and organic or non-organic hydroponic growing media. The term "air root pruner" is used herein in its conventional prior art sense, viz., a device which exposes to ambient air a sufficient number of the growing root tips of the plant which grow into one or more orifices in the device to terminate their growth pattern, thereby stimulating the development and growth of fine hair roots laterally along the thus-pruned roots and the subsequent vegetative growth rate of the plant. The term "aerating Root Pruner" as used herein means an air root pruner which also acts as a conduit for ambient air into the planting medium in which a plant is growing of sufficient ambient air to aerate the planting medium, thereby further enhancing development of a root ball containing a high proportion of hair roots which contribute to the accelerated growth rate of the root ball and thus the vegetative growth rate of the plant.

With reference to the drawings, the assembled embodiment of an IARP 10 shown in FIGS. 1 and 2 consists of two identical tray-shaped rectangular perforated sheet members 12, each of which has a solid walled upper end portion 19 which has a flat walled water barrier/mark panel 20 and which is adapted to project at least partially above the surface of the planting medium in which IARP 10 is inserted; a perforated middle portion 21 adapted to provide passage ports for ambient air and water from the interior of IARP 10 into the planting medium and access for plant roots in the planting medium into the interior of IARP 10; and a solid walled lower end portion 23 which is angled to form with the companion lower end portion 23 of each twin sheet member 12 a chisel-shaped point 24, which is the leading end of sheet members 12 when IARP 10 is inserted into planting medium and is constructed to resist deformation or breakage when the planting medium is hard packed.

A flange 14 which-projects perpendicularly outwardly from the top edge of upper portion 19 of each sheet member 12 is strengthened by a plurality of spaced apart flange support ribs 16 projecting from the exterior front and side walls of a water barrier/mark panel 20 and thickened triangular portions 18 projecting outwardly for the two side walls of sheet member 12. The middle portion 21 of each sheet member 12 contains multiple rows of rectangular apertures 22 which produce a grated structure in the bottom wall thereof and has a plurality of corner vents 28 at the edge intersection of the bottom wall and side walls thereof, some of which also act as assembly slots 26 for correspondingly positioned assembly tabs 27 which project from the bottom edge of the side walls of the other sheet member. The exterior face of solid lower end portion 23 of each sheet member 12 consists of a pair of beveled panels which collectively, when the sheet members are joined together to produce an IARP, taper towards each other form a chisel-shaped point 24 adapted to facilitate the insertion of IARP 10 into planting medium.

To assemble the elements shown in FIG. 10 into the assembled IARP 10 shown in FIGS. 1–5, two sheet members 12 are aligned in a mirror image configuration with their interiors shown in FIG. 7, facing each other and then pressed together until all of the assembly catch tabs 27 snap into place in assembly slots 26, where they are held firmly in place by stabilizer posts 30 which fit snugly in stabilizer receiving grooves 32.

In the combination embodiment shown in FIG. 10, the IARP 10 is used in combination with a cutter plate 39 which, like IARP 10, has a solid upper portion 40 one face of which optionally has a smooth mark panel 42 onto which directions for use and/or a product logo can be affixed. At the top of cutter plate 39 is a canopy flange 48 which projects perpendicularly therefrom and is strengthened by support ribs 52 and optionally has a direction indicating arrow 50 on its upper face which identifies the direction cutter plate 39 should face when inserted into IARP 10. Like IARP 10, cutter plate 39 has perforations 44 therein corresponding to those in IARP 10 and positioned so that they can be in registry therewith when the cutter plate 39 is inserted appropriately in IARP 10. The bottom edge 54 of cutter plate 39 is sharp to form a cutting edge to facilitate severing roots which grow into IARP 10.

To use IARP 10 in combination with cutter plate 39, the latter is inserted into the open end of the IARP and slid along the interior face of either sheet member 12, with its direction indicator arrow 50 pointing toward the exterior face of that sheet member, in the space defined by the interior face of that sheet member and cutter positioning guides 34 until it is stopped by the pair of cutter positioning tabs 38 on the inner face of the sheet member 12 seating respectively in the pair of cutter positioning notches 46 in cutter plate 39, at which point their respective apertures 22 and perforations 44 are in registry. When plant roots grow into and through these apertures and perforations, raising the cutter plate slightly can sever them, whereafter the cutter plate can be withdrawn entirely or pushed back into a position in which its perforations 44 are again in registry with the apertures 22 in IARP 10.

When IARP 10 is used in combination with cutter plate 39, to assist in inserting the IARP into a planting medium, cutter plate 39 is first inserted into the open end of the IARP and slid between the interior faces of the two sheet members 12 until the cutter is fully inserted and the cutting edge 54 of the lower end thereof contacts chisel support ribs 36 projecting inwardly from the inner surface of lower end portion 23 of the IARP. The IARP and cutter combination is then forced into the planting medium, leaving the top flange 14 of the IARP 10 above the surface of the planting medium. The cutter plate is then withdrawn completely from the IARP, leaving the interior unobstructed and free of debris.

When an IARP 10 is used alone as an aerating stake, as roots grow into the IARP over time, they can be severed by inserting the cutter plate 39 fully into IARP 10 and then withdrawing it therefrom. The severed roots are forced into the bottom portions of IARP 10 where they dehydrate or decompose leaving little residue.

To disassemble an IARP 10 after use for cleaning and reuse, first remove cutter plate 39 if one is inserted therein and then sequentially press inwardly the three tabs assembly 27 on one side of the IARP, thereby disengaging them from assembly slots 26 and permitting the two sheet members 12 to separate.

With reference to FIGS. 16–18, the cylindrical IARP 56 shown therein comprises two half cylinder members connected by a plurality of living hinges 74 which enable the two halves to be folded together, with their side edges registered and aligned by a plurality of alignment pins 68 and matching alignment wells 70 and held in place by a plurality of complementary catches 64 and tabs 66 along their mating side edges, thereby creating a hollow cylindrical tube. The bottom or insertion end of each half is hemi-conical in shape so that when the two halves are fitted together to form a cylindrical tube, the bottom end forms a conical insertion tip 72. Each half of the cylindrical IARP 56 has perforations 58 therein comparable to those in an IARP 10. Each half is also equipped with a stabilizing wing 60 which prevents rotation of the cylindrical IARP in the planting medium when a cylindrical cutter comparable to rectangular cutter plate 39 is used to sever roots which have grown into the interior of the cylindrical IARP 56, and a flange 62 at its upper end. In all other respects, the cylindrical IARP 56 is functionally identical to the preferred embodiment of the IARP 10 with the exception that the cylindrical IARP is a single piece unit which is folded into its locked position rather than two identical units being snapped together.

The aerating root pruners of this invention can be produced using conventional injection molding processes using polypropylene, polyethylene, ABS or other thermoplastic polymer. The two sheet members which form the rectangular IARP preferably are identical, as shown in FIGS. 1–15. Both sheet members 12 being identical eliminates the need for the user to match dissimilar pieces as well as reducing the cost of tooling, manufacturing, packaging and reducing the inventory of parts by half However, they can have other configurations, as shown in FIGS. 16–18.

The geometry of the perforations in the sheet members 12 can vary widely, provided it results in a high ratio, i.e., at least about 1:1, of open area (provided by the apertures) to solid area (provided by the solid portions of the sheet members), e.g., from about 0.75:1 to 3:1, preferably about 2:1. The perforations can be circular, oval, triangular, square, rectangular or any other shape, which can be economically manufactured. In the preferred IARP embodiment shown in FIGS. 1–15, the perforations are rectangular with their longer dimension (length) perpendicular to the longer dimension (length) of the sheet members. As shown in FIG. 14, the four walls of each aperture in the sheet member defining a perforation are tapered, thereby providing apertures whose width and length dimensions at the outer face of the sheet member are larger than those at the inner face of the sheet member. The walls of each aperture in the sheet members defining a perforation have a radius on their outer faces which direct roots growing the sheet member into the perforations without obstruction by the ribs and rails separating the apertures solid walled lower end portion.

The inner face of sheet member 12 can be flat as shown in FIGS. 1–15 or convexly curved relative to its perforated face to increase the volume of the conduit formed when two of the sheet members are joined to form an IARP, in which case cutter solid upper portion and cutter plate 39 will also be correspondingly curved so as to be in sliding registry with the inner face of the sheet member.

The inserter/cutter 76 is a two part device which when snapped together makes a single unit which accepts a traditional threaded broom handle in its handle flange 82 threaded 80 portion. When assembled the inserter/cutter alignment pins 78 align the walls of the inserter/cutter and create a rectangular unit which fits easily within the IARP of this invention. The handle flange 82 is strengthened by the addition of the handle snap pin 84 which penetrates under pressure the handle snap pin slot 86 and locks the handle flanges 82 together. A series of spaced apart snap catches 88 along one side of the inserter/cutter 76 are received by snap catch receiving ports 92 along the opposing edge. On the face of the inserter/cutter 76 is located a slip ratchet 90 which adds a flexible resistance to the IARP 10 when the inserter/cutter is inside the IARP but not enough resistance to prevent ready withdrawal of the inserter/cutter from the IARP once it has been implanted in the soil or other media. A centering post 94 located on the side of the handle flange 82 assists in alignment of the handle snap pins 84. The bottom cutting edge 96 of the inserter/cutter 76 severs roots that grow within the IARP 10 when the inserter/cutter is inserted therein. Wall thinning cut outs 98 are provided to reduce the amount of material required and wall strengthening ribs 100 create a rigid interior which meets its opposite member when the IARP 10 is assembled.

Significant increases in plant growth rates can be achieved with the IARP and IARP/cutter combinations of this invention, the amount of the increase depending on the species of plant grown in the combination, and normal variables, such as water, light and nutrients. For example, with a fast growing species, such as tomato and string bean plants, increases in plant mass of 60–80% or more after 90 days over that of corresponding plants grown in the same plant growing container without an IARP 10 or 56 can be achieved. The same species of plants yield increases of plant mass of 20–30% after as little as 30 days over that of corresponding plants grown in identical containers and conditions without the IARP. As would be expected, such increased growth rates require increased fertilization and watering rates but not proportionally because the assimilation thereof is more efficient as a result of a more uniform moisture content throughout the planting medium. This means less water consumption due to over-watering as a result of water channeling directly along the side wall of the plant growing container without uniform penetration throughout the root ball. The air root pruning activity of the combination also has the beneficial effect on growth rate which has been established in the prior art but heretofore could not be commercially realized because of the added cost of achieving an air root pruning effect using custom made plant growing containers whose walls or inner liners are structured to achieve the effect.

The IARP of this invention is lacking any undercuts which would complicate and increase the cost of tooling and manufacturing, thereby creating what is commonly referred to as a "straight shot" tool, resulting in faster and more economical manufacture. The IARP 10 also stacks and step-nests, thus allowing compact packaging and thereby reducing storage and transportation costs.

LIST OF REFERENCE NUMBERS

10 Implantable aerating root pruner (IARP)
12 Perforated sheet member
14 Flange
16 Flange support rib
18 Flange strengthener
19 Upper portion of IARP
20 Water barrier/mark panel
21 Middle portion of IARP
22 Apertures
23 Lower end portion of IARP
24 Chisel-shaped point
26 Assembly catch slot/s
27 Assembly catch tab/s
28 Corner vent/s
30 Stabilizer post/s
32 Stabilizer receiving groove
34 Cutter positioning guide/s
36 Chisel support rib/s
38 Cutter positioning tab/s
39 Cutter/insertion plate
40 Cutter upper portion
42 Cutter mark panel
44 Cutter perforations
46 Cutter positioning notch
48 Canopy flange
50 Direction indicator arrow
52 Cutter support ribs
54 Cutting edge
56 Cylindrical IARP
58 Cylindrical perforations
60 Stabilizing wings
62 Cylindrical flange
64 Cylindrical catch
66 Retention tabs
68 Alignment pins
70 Alignment wells
72 Conical insertion tip
74 Living hinge
76 Inserter/cutter
78 Inserter/cutter alignment pins
80 Threads
82 Handle flange
84 Handle snap pin
86 Handle snap pin slot
88 Snap catches
90 Slip ratchet
92 Snap catch receiving port
94 Centering post
96 Cutting edge
98 Wall thinning cut outs
100 Wall strengthening ribs

What is claimed is:

1. An implantable aerating root pruner (IARP) comprising a pair of separate, thin walled substantially flat and rigid sheet members, each having interior and exterior faces, dismountably fitted together or adapted to be dismountably fitted together to form the IARP in a spaced apart configuration which forms a thin elongate rectangular hollow box-like structure whose front and back faces are formed by the sheet members and comprise joining means which render the sheet members readily joinable together and separable from each other, at least one of which sheet members have a plurality of apertures therein which form an apertured grate-like structure which provides the face of the IARP with a high ratio of open area to solid area, a first end of each of which sheet members is tapered to form, when the sheet members are fitted together to form the IARP, a solid beveled edge to facilitate insertion of the IARP into planting medium, wherein the end portion of the other end of each sheet member, is solid without apertures therein and is adapted to project above the surface of the planting medium, which IARP provides ambient air access to the planting medium along the length of the IARP when the IARP is inserted in the planting medium and thereby promotes enhanced aeration of and uniform distribution of water in the planting medium from the surface of the planting medium to the said solid beveled edge of the IARP and which has an air root pruning effect on the roots of a plant growing proximate thereof in the planting medium.

2. The IARP of claim 1, wherein both sheet members each have a plurality of apertures; the apertures therein are rectangular and their longer dimension is perpendicular with respect to the vertical axis of the IARP; and the exterior face of each of the sheet members is convex so that the sheet members are thicker at the center of their vertical axis than at their vertical edges.

3. The IARP of claim 1, wherein the plurality of apertures are tapered so that the size of the apertures at the exterior face of each of the sheet members is larger than the size of the plurality of apertures at the interior face thereof.

4. An IARP of claim 1 formed of injection molded polypropylene.

5. The IARP of claim 1, wherein the apertures provide a ratio of open area to solid area of about 2:1.

6. The IARP of claim 1, wherein the sheet members are identical; both are apertured with a ratio of open area to solid area of about 2:1; the apertures are rectangular and their longer dimension is perpendicular with respect to the veltical axis of the IARP; the apertures are tapered so that the size of the apertures at the exterior face of each of the sheet members is larger than at the interior face thereof; and the exterior face of each of the sheet members are convex so that the sheet members are thicker at the center of their vertical axis than at their vertical edges.

7. A combination of an of claim 6 and an elongate rectangular thin-walled grate-like apertured substantially rigid root cutter plate which is adapted to be slideably and removably partially inserted into the IARP in sliding contact with the inner face of one of the apertured sheet members of the IARP to a first position at which the end thereof which is inserted first is proximate the lower end portion of the IARP, said other end thereof projects outside the IARP and said apertures are in registry with the apertures of the sheet member with which the cutter plate is in sliding contact and is adapted to be inserted further to a second position in the IARP at which the end thereof which is inserted first is in contact with the inner face of the lower end portion of the sheet member and said apertures are out of registry with the apertures in the sheet member, thereby mechanically severing any roots which have invaded the space between the cutter plate and the inner wall of the other sheet member.

8. A combination of claim 7, wherein the cutter plate has a canopy on its second end which covers the air space between the upper ends of the two sheet members which form the IARP, thereby preventing planting medium or debris or trash from entering that space while a plant is growing in the plant pot, IARP but permits movement of ambient air within the IARP.

9. A method of using the combination of claim 7 to promote the growth rate of a plant by both mechanically and air root pruning the roots thereof, which comprises the successive steps of (a) inserting the combination into the planting medium, either before the plant is planted therein or thereafter before the root ball of the plant has fully formed, at a position close enough to the growing plant to be contacted by the tips of the growing roots of the plant; (b) maintaining IARP in the plant medium, with the cutter plate positioned in the IARP so that their respective apertures are in registry, for a period of time until roots in the growing plant have invaded the interior of the IARP; and (c) thereafter removing the cutter plate from the first position in the IARP to a second position in which the respective apertures of the sheet members and the cutter plate are out of registry thereby mechanically severing the roots which have invaded the IARP.

10. A method of using an IARP of claim 6 to promote the growth rate of a plant by air root pruning the roots thereof, which comprises the steps of inserting the IARP in the plant medium either before the plant is planted therein or thereafter before the root ball of the plant has fully formed, at a position close enough to the growing plant to be contacted by the tips of the growing roots of the plant; and maintaining the IARP in the planting medium for a period of time until roots of the growing plant have invaded the interior of the IARP.

11. A method of claim 10, comprising the further steps of (a) slideably and removably inserting a cutter tool into the interior of the IARP until the leading end is at least substantially completely inserted therein, either before the IARP is inserted in the planting, to assist the insertion of the IARP therein, or thereafter when the roots of the plant have invaded the interior of the IARP, or both before and thereafter, to mechanically sever the roots which have invaded the interior of the IARP and (b) thereafter withdrawing the cutter tool from the IARP.

12. A combination of an implantable aerating root pruner (IARP) and a cutter plate, comprising a pair of thin walled substantially rigid sheet members dismountably fitted together in a spaced apart configuration which forms a stake-like IARP, at least one of which sheet members having a plurality of apertures therein which form a grate-like structure which provides the IARP with a high ratio of total open area to total surface area, a first end of each of which sheet members is tapered to form, when the sheet members are fitted together to form the IARP, a solid beveled edge or point to facilitate insertion of the IARP into planting medium, which said end portion of the other end of each sheet members is solid without apertures therein, and is adapted to project above the surface of the planting medium, which IARP provides ambient air access to the planting medium along the length of the IARP when the IARP inserted in the planting medium and thereby promotes enhanced aeration of and uniform distribution of water in the planting medium from the surface of the planting medium to the end portion of the IARP and which has an air root pruning effect on the roots of a plant growing proximate thereof in the planting medium; and an elongate rectangular thin-walled grate-like apertured substantially rigid root cutter plate adapted to be slideably and removably inserted into the IARP in sliding contact with the inner face of one of the apertured sheet members of the IARP to a first position at which the end thereof which is inserted first is proximate the lower end portion of the IARP, the second end thereof projects outside the IARP and said apertures are out of registry with the apertures of the sheet member with which the cutter plate is sliding contact and is adapted to be inserted further to a second position in the IARP at which the end thereof which is inserted first is in contact with the end portion of the sheet member and said apertures are in registry with the apertures in the sheet member, and thereby mechanically sever any roots which have invaded the space between the cutter plate and the inner wall of the other sheet member.

13. A combination of claim 12, wherein the cutter plate has a canopy on its second end which covers the air space between the upper ends of the two sheet members which form the IARP, thereby preventing planting medium or debris or trash from entering that space while a plant is growing in the plant pot without blocking movement of ambient air within the IARP.

14. A method of using the combination of claim 12 to promote the growth rate of a plant by both mechanically and air root pruning the roots thereof, which comprises the successive steps of (a) inserting the combination into the planting medium, either before the plant is planted therein or thereafter before the root ball of the plant has fully formed, at a position close enough to the growing plant to be contacted by the tips of the growing roots of the plant; (b) maintaining IARP in the plant medium, with the cutter plate positioned in the IARP so that their respective apertures are in registry, for a period of time until roots in the growing plant have invaded the interior of the IARP; and (c) thereafter moving the cutter plate from the first position in the IARP to a second position in which their respective apertures of the sheet members and the cutter plate are out of registry, thereby mechanically severing the roots which have invaded the interior of the IARP.

15. A method of using an IARP of claim 1 to promote the growth rate of a plant by air root pruning the roots thereof, which comprises the step of inserting the IARP in the plant medium, either before the plant is planted therein or thereafter before the root ball of the plant has fully formed, at a position close enough to the growing plant to be contacted by the tips of the growing roots of the plant; and maintaining the IARP in the planting medium for a period of time until roots of the growing plant have invaded the interior of the IARP.

16. A method of claim 15, comprising the further steps of (a) inserting into the planting medium with a handled cutter tool slideably and removably into the interior of the IARP until the leading end is at least substantially completely inserted therein, either (i) before the IARP is positioned in the planting to assist the insertion of the IARP therein, or (ii) thereafter when the roots of the plant have invaded the interior of the IARP to mechanically sever the roots which have invaded the interior of the IARP or (iii) both before and thereafter; and (b) thereafter withdrawing the cutter tool from the IARP.

* * * * *